United States Patent
Sugiura

(10) Patent No.: US 9,197,474 B2
(45) Date of Patent: Nov. 24, 2015

(54) OFDM COMMUNICATION SYSTEM

(71) Applicant: DENSO CORPORATION, Kariya, Aichi-pref. (JP)

(72) Inventor: Yoshie Sugiura, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/514,680

(22) Filed: Oct. 15, 2014

(65) Prior Publication Data

US 2015/0163081 A1   Jun. 11, 2015

(30) Foreign Application Priority Data

Dec. 5, 2013   (JP) ................................. 2013-252024

(51) Int. Cl.
*H04L 27/26* (2006.01)

(52) U.S. Cl.
CPC ........ *H04L 27/2602* (2013.01); *H04L 27/2678* (2013.01)

(58) Field of Classification Search
CPC ....................... H04L 27/2607; H04L 27/2678
See application file for complete search history.

(56) References Cited

U.S. PATENT DOCUMENTS

| | | | |
|---|---|---|---|
| 6,714,511 B1 | 3/2004 | Sudo et al. | |
| 7,227,890 B2 * | 6/2007 | Moon et al. | 375/222 |
| 8,576,961 B1 * | 11/2013 | Zhu et al. | 375/343 |
| 2003/0090994 A1 * | 5/2003 | Kakura | 370/208 |
| 2005/0099936 A1 * | 5/2005 | Fujii et al. | 370/203 |
| 2005/0237918 A1 | 10/2005 | Asai et al. | |
| 2006/0056462 A1 | 3/2006 | Miyoshi | |
| 2007/0002726 A1 | 1/2007 | Zangi | |
| 2008/0002645 A1 | 1/2008 | Seki et al. | |
| 2008/0152048 A1 * | 6/2008 | Adachi | 375/343 |
| 2009/0080555 A1 * | 3/2009 | Li | 375/260 |
| 2009/0147867 A1 | 6/2009 | Okamoto et al. | |
| 2009/0245222 A1 | 10/2009 | Sampath et al. | |
| 2009/0296862 A1 * | 12/2009 | Nakaya | 375/343 |
| 2009/0304126 A1 | 12/2009 | Sahara | |
| 2009/0316812 A1 | 12/2009 | Sahara | |
| 2011/0164708 A1 * | 7/2011 | Wang | 375/343 |
| 2013/0169421 A1 | 7/2013 | Murase et al. | |
| 2014/0153655 A1 | 6/2014 | Abe et al. | |

FOREIGN PATENT DOCUMENTS

| | | |
|---|---|---|
| JP | H11-308195 A | 11/1999 |
| JP | 2002-374223 A | 12/2002 |

(Continued)

*Primary Examiner* — Aristocratis Fotakis
(74) *Attorney, Agent, or Firm* — Posz Law Group, PLC

(57) ABSTRACT

A master apparatus includes a guard interval length determination portion that requests a plurality of slave apparatuses to cause the slave apparatuses to transmit respective OFDM signals of regular sequence in order without being mutually overlapped. The OFDM signal is obtained by adding a guard interval having a specified initial length to a regular valid symbol that is obtained by applying OFDM modulation to a regular data. A correlator outputs a cross correlation value between the regular sequence and a reception sample sequence. The guard interval length determination portion stores as a delay time a time interval from when the cross correlation value exceeds a first threshold value to when the cross correlation value exceeds a second threshold value. A common length of the guard interval is determined based on the maximum delay time among the delay times with respect to the respective slave apparatuses.

5 Claims, 15 Drawing Sheets

(56) References Cited

FOREIGN PATENT DOCUMENTS

| | | | |
|---|---|---|---|
| JP | 2005-130010 | A | 5/2005 |
| JP | 2006-180321 | A | 7/2006 |
| JP | 2008-294588 | A | 12/2008 |
| JP | 2008-312053 | A | 12/2008 |
| JP | 2012-175519 | A | 9/2012 |
| WO | 2010/113887 | A1 | 10/2010 |

* cited by examiner (a) CHANNEL 1

DELAY OF PREVIOUS SYMBOL

DIRECT OF PRESENT SYMBOL

GI LENGTH>DELAY (b) CHANNEL 2

DELAY OF PREVIOUS SYMBOL

DIRECT OF PRESENT SYMBOL

GI LENGTH>DELAY (c) CHANNEL 3

DELAY OF PREVIOUS SYMBOL

DIRECT OF PRESENT SYMBOL

GI LENGTH<DELAY

DIRECT WAVE ALONE

DIRECT WAVE + DELAY WAVES DELAYING 1-3 SAMPLE TIME

DIRECT WAVE + DELAY WAVES DELAYING 1-5 SAMPLE TIME

DIRECT WAVE + DELAY WAVES DELAYING 1-7 SAMPLE TIME

FIG. 13

| MAX DELAY TIME $\tau$max | GI LENGTH SET VALUE |
|---|---|
| 1 | 1 |
| 2 | 2 |
| ⋮ | ⋮ |
| N | N |

FIG. 15

| MAX DELAY TIME $\tau$max | GI LENGTH SET VALUE |
|---|---|
| 1 | 2 |
| 2 | 4 |
| ⋮ | ⋮ |
| N | 2N |

OFDM COMMUNICATION SYSTEM

CROSS REFERENCE TO RELATED APPLICATION

The present application is based on Japanese Patent Application No. 2013-252024 filed on Dec. 5, 2013, the disclosure of which is incorporated herein by reference.

TECHNICAL FIELD

The present disclosure relates to a communication system that includes a master apparatus and slave apparatuses to be connected via a transmission line in performing communications with OFDM signals.

BACKGROUND ART

Patent Literature 1: JP 2008-312053 A

A vehicle is mounted with ECUs (Electronic Control Units), sensors, actuators, and the like. Communications are needed between the ECUs, between the ECUs and the sensors, or between the ECUs and the actuators for sharing data, inputting detection values or operating states, or outputting operation instructions. Further, a power line communication (PLC) system is recently studied so as to perform communications and transfer of power via a transmission cable. The PLC system performs modulation communications using a contactless coupler at a branch between the transmission cable and a node.

The transmission cable includes a plurality of branches; this favors an OFDM communication (Orthogonal Frequency Division Multiplexing) providing a multipass resistance. The case of using the OFDM communication needs to prevent an inter symbol interference by setting a guard interval to be longer than a delay spread of reflected waves. For example, a communication system mounted in a vehicle is variable in the number of channels since a node is permitted to be attached or detached to a transmission cable in a dealer-installed option. That is, the topology in the communication bus is caused to change; this changes a delay spread of reflected waves in the system. The system thus needs to expect a worst value in the delay spread and previously lengthen a guard interval sufficiently. However, the lengthened guard interval may pose a redundancy that increases an electricity consumption and decreases a transmission efficiency.

Patent Literature 1 describes a control method to adjust a guard interval to be an optimum length so as to perform data communications efficiently between a master apparatus and slave apparatuses. In this control method, a slave apparatus sets a length of the guard interval to an initial value based on the notice information from the master apparatus. Then, when not receiving normally a response from the slave apparatus, the master apparatus repeatedly performs a process that increases the length of the guard interval step by step until the master apparatus can receive the reception successfully.

The control method in Patent Literature 1 causes the master apparatus to execute a step-by-step adjustment by repeating a lengthening process of lengthening a guard interval with respect to each of the slave apparatuses; this increases a time necessary for determining the guard interval lengths of all the slave apparatuses as the number of slave apparatuses increases. For example, suppose a case that the number of slave apparatuses is N and the number of repetitions of the lengthening process for each slave apparatus is k. In this case, a time necessary for determining the guard interval lengths of all the slave apparatuses needs N×k times a time of the lengthening process for lengthening the guard interval with respect to each slave apparatus.

SUMMARY

It is an object to provide a communication system that dynamically determines a length of a guard interval for an OFDM signal in a time shorter than that in a conventional technology.

To achieve the above object, according to an aspect of the present disclosure, a communication system includes a master apparatus that is connected to a transmission line and performs communications with OFDM signals, and a plurality of slave apparatuses that are connected to the transmission line and perform communications with OFDM signals. The master apparatus includes a transmission portion, a reception portion, a guard interval length determination portion, and a correlation calculation portion. The transmission portion transmits via the transmission line OFDM signals obtained by adding guard intervals to valid symbols, the valid symbols being obtained with OFDM modulation. The reception portion receives signals via the transmission line, samples the received signals to obtain reception sample sequences, removes guard intervals from OFDM signals in the reception sample sequences to obtain valid symbols, and applies OFDM demodulation to the valid symbols. The guard interval length determination portion outputs a request to the slave apparatuses to cause the slave apparatuses each to (i) prepare an OFDM signal of a second regular sequence and (ii) transmit the OFDM signal of the second regular sequence in order without overlap between the slave apparatuses. The slave apparatuses each prepares the OFDM signal of the second regular sequence by applying OFDM modulation to a regular data to obtain a regular valid symbol and adding the guard interval having a specified length greater than zero to the obtained regular valid symbol. The correlation calculation portion calculates a cross correlation value between (i) a first regular sequence and (ii) the reception sample sequence obtained by sampling the OFDM signal of the second regular sequence transmitted from each of the slave apparatuses. The correlation calculation portion prepares the first regular sequence by applying OFDM modulation to the regular data to obtain the regular valid symbol and adding the guard interval having the specified length to the regular valid symbol. Further, the guard interval length determination portion stores, as a delay time of each of the slave apparatuses, a time interval from when the cross correlation value outputted by the correlation calculation portion exceeds a first threshold value after outputting the request to each of the slave apparatuses to when the cross correlation value exceeds a second threshold value, obtains a maximum delay time among the delay times of the slave apparatuses, determines a common length of the guard interval that is used in common for communications between the master apparatus and the plurality of slave apparatuses based on the maximum delay time, and transmits the common length of the guard interval to the slave apparatuses.

In the above configuration, the master apparatus requests the respective slave apparatuses to transmit the OFDM signal of the second regular sequence in order without overlap between the slave apparatuses, obtains the respective delay times depending on the channels with the slave apparatuses based on the cross correlation value between the first regular sequence and the reception sample sequence, and determines the common length of the guard interval based on the maximum delay time among the delay times of all the slave apparatuses. Therefore, even if the topology of the transmission line is changed due to the addition/deletion of a node or a branch point, the common length of the guard interval can be determined dynamically so as to prevent the increase in the electricity consumption and the decline in the transmission efficiency due to the redundancy. In addition, only one transmission/reception is needed for each slave apparatus; thus, the length of the guard interval can be determined with a short time as compared with a conventional technology that needs a plurality of transmissions/receptions.

BRIEF DESCRIPTION OF THE DRAWINGS

The above and other objects, features, and advantages of the present disclosure will become more apparent from the following detailed description made with reference to the accompanying drawings. In the drawings:

FIG. 13 is a diagram illustrating data contents referenced when determining a guard interval length;

FIG. 15 is a diagram illustrating other data contents referenced when determining a guard interval length;

DETAILED DESCRIPTION

Figure 1A:
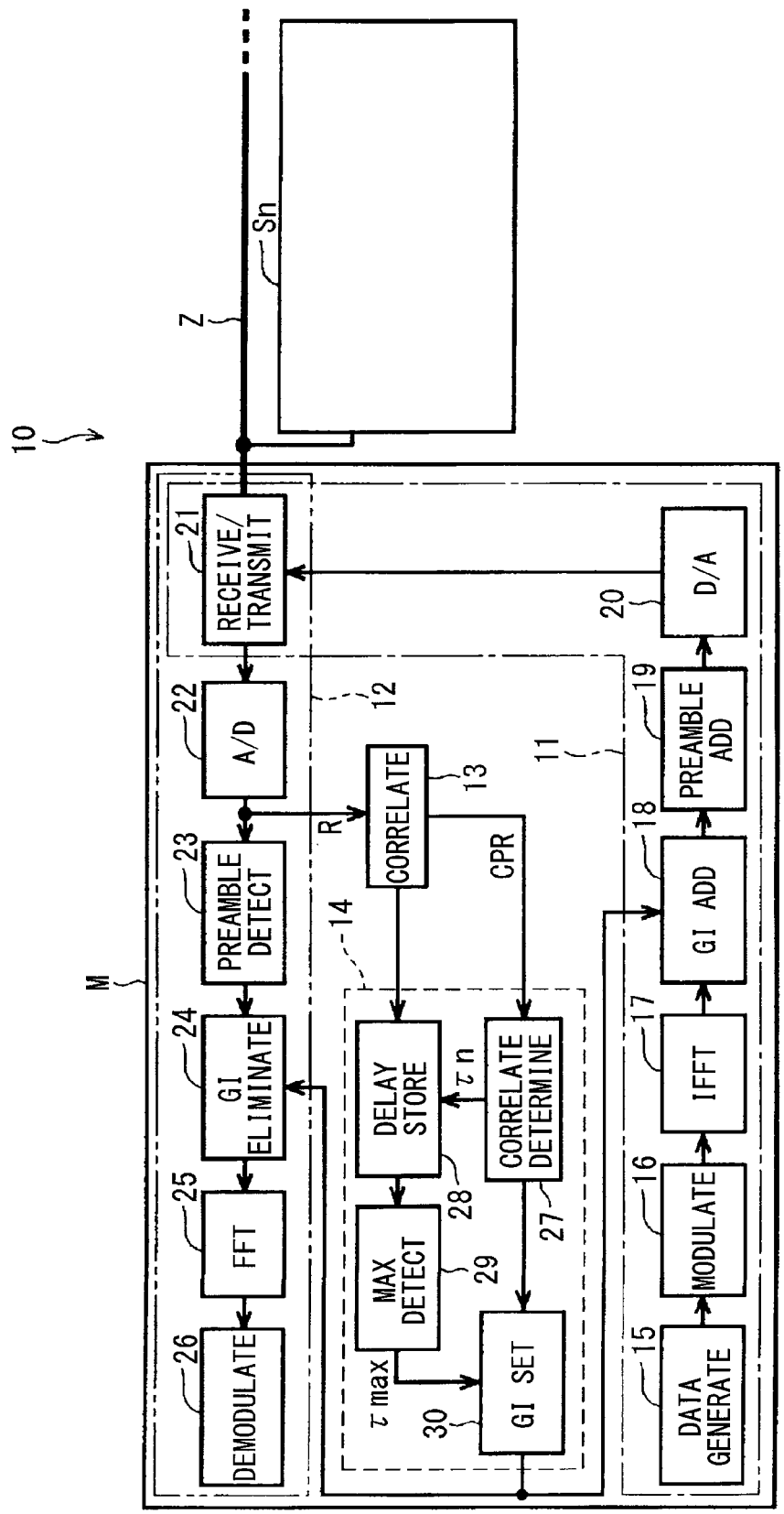
FIG. 1A is a block diagram of a master apparatus according to a first embodiment of the present disclosure.

In embodiments according to the present disclosure, a substantively identical element or configuration is assigned with an identical reference number and the duplicated explanation is omitted.

First Embodiment

The following explains a first embodiment of the present disclosure with reference to FIGS. 1A to 13. A communication system 10 in FIG. 2 includes as nodes a single master apparatus M and a plurality of slave apparatuses Sn (n=1, 2, . . . N); the master apparatus M and the slave apparatuses Sn are connected to a transmission cable Z (transmission line).

Reflection arises at a terminal end and at a branch point where a node is connected; thus, a channel formed between the master apparatus M and each slave apparatus Sn forms a multipass channel involving delay waves in addition to a direct wave. Thus, the master apparatus M and each slave apparatus Sn perform communications with an OFDM (Orthogonal Frequency Division Multiplexing) modulation mode. In a communication network in a vehicle, the master apparatus M includes an ECU (Electronic Control Unit), whereas each slave apparatus Sn includes a sensor and an actuator. The transmission cable Z includes a twisted-wire cable.

The master apparatus M includes a transmission portion 11, a reception portion 12, a correlator 13, and a guard interval (GI) length determination portion 14 as indicated in FIG. 1. The transmission portion 11 includes a transmission data generation portion 15, a primary modulation portion 16, an IFFT portion 17, a GI (Guard Interval) addition portion 18, a preamble addition portion 19, a D/A converter 20, and an RF transmission/reception portion 21. The transmission data generation portion 15 generates a transmission bit string. The primary modulation portion 16 maps the transmission bit string (i.e., a symbol) on a complex symbol with a modulation mode such as QPSK or QAM. The IFFT (Inverse Fast Fourier Transformation) portion 17 is an OFDM modulator to generate an OFDM symbol (valid symbol) by executing inverse Fast Fourier Transformation to associate a complex symbol with a plurality of subcarriers.

The GI addition portion 18 generates an OFDM signal by adding a guard interval to each valid symbol; the guard interval has a length that is determined by the GI length determination portion 14. The preamble addition portion 19 adds a preamble to a starting point of a frame; the preamble is used for symbol synchronization. The D/A converter 20 generates a transmission signal on base band continuously by applying D/A conversion to the frame. The RF transmission/reception portion 21 converts the transmission signal on base band into a transmission signal on carrier band and transmits it via the transmission cable Z.

The reception portion 12 includes an RF transmission/reception portion 21, an A/D converter 22, a preamble detection portion 23, a GI elimination portion 24, an FFT portion 25, and a primary demodulation portion 26. The RF transmission/reception portion 21 converts a received signal on carrier band into a signal on base band, and outputs it to the A/D converter 22. The A/D converter 22 obtains a reception sample sequence R by sampling the received signal on baseband and subjecting it to A/D conversion.

The preamble detection portion 23 detects a preamble that indicates a starting point of the frame so as to perform symbol synchronization. The GI elimination portion 24 removes the guard interval from the OFDM signal in the reception sample sequence R, and obtains an OFDM symbol (valid symbol). The FFT portion 25 is an OFDM demodulator that subjects the valid symbol to FFT (Fast Fourier Transformation) to generate a complex symbol corresponding to subcarriers. The primary demodulation portion 26 de-maps (i.e., converts) the demodulated complex symbol into a reception bit string (symbol).

The master apparatus M and all the slave apparatuses S1 to SN have in common a regular data, which is used for a process for determining a guard interval length. The correlator 13 (correlation calculation portion) outputs a cross correlation value $CPR(\tau)$ between a regular sequence P and a reception sample sequence R. The regular sequence P is obtained by adding a guard interval having an initial length to a valid symbol that is obtained by subjecting the regular data to OFDM modulation. The reception sample sequence R is outputted from the A/D converter 22.

Figure 3:
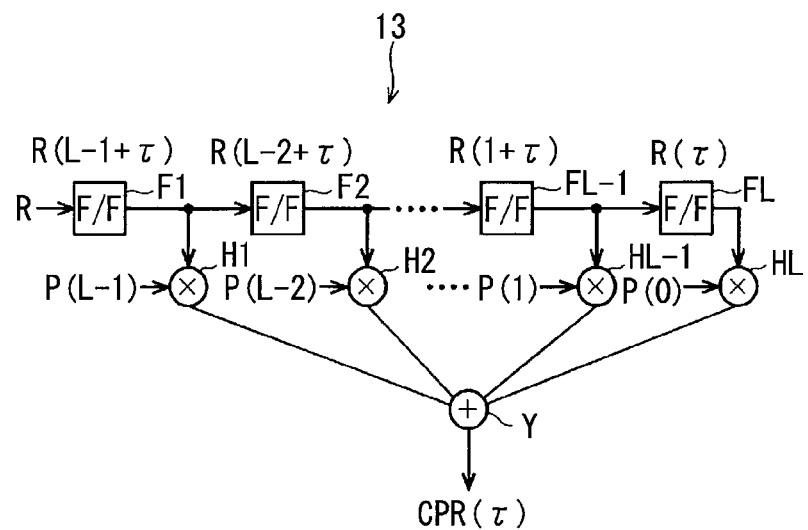
FIG. 3 is a diagram of a configuration of a correlator according to the first embodiment.

With reference to FIG. 3, the correlator 13 includes a shift register including L registers F1 to FL that are connected in series. The registers F1 to FL each include a flip-flop (F/F). This shift register receives a reception sample sequence R, and carries out a shift operation with respect to each sample of the reception signal in the reception portion 12. Furthermore, the correlator 13 includes multipliers H1 to HL and an addition unit Y. Each of the multipliers H1 to HL multiplies an output value of each of the registers F1 to FL by a coefficient (i.e., regular sequence P in the present embodiment) with respect to each of samples, to thereby obtain each multiplication value. The addition unit Y calculates a total sum of the multiplication values of the multipliers H1 to HL.

Figure 2:
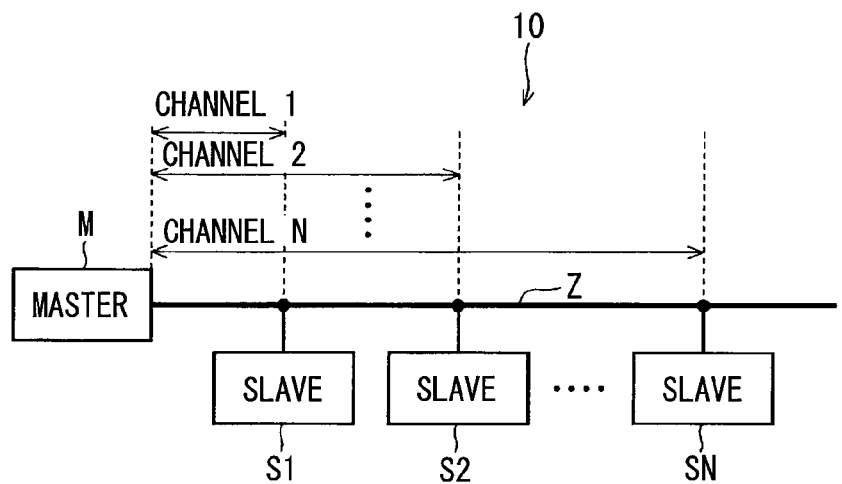
FIG. 2 is a diagram of an overall configuration of a communication system according to the first embodiment.
Figure 4:
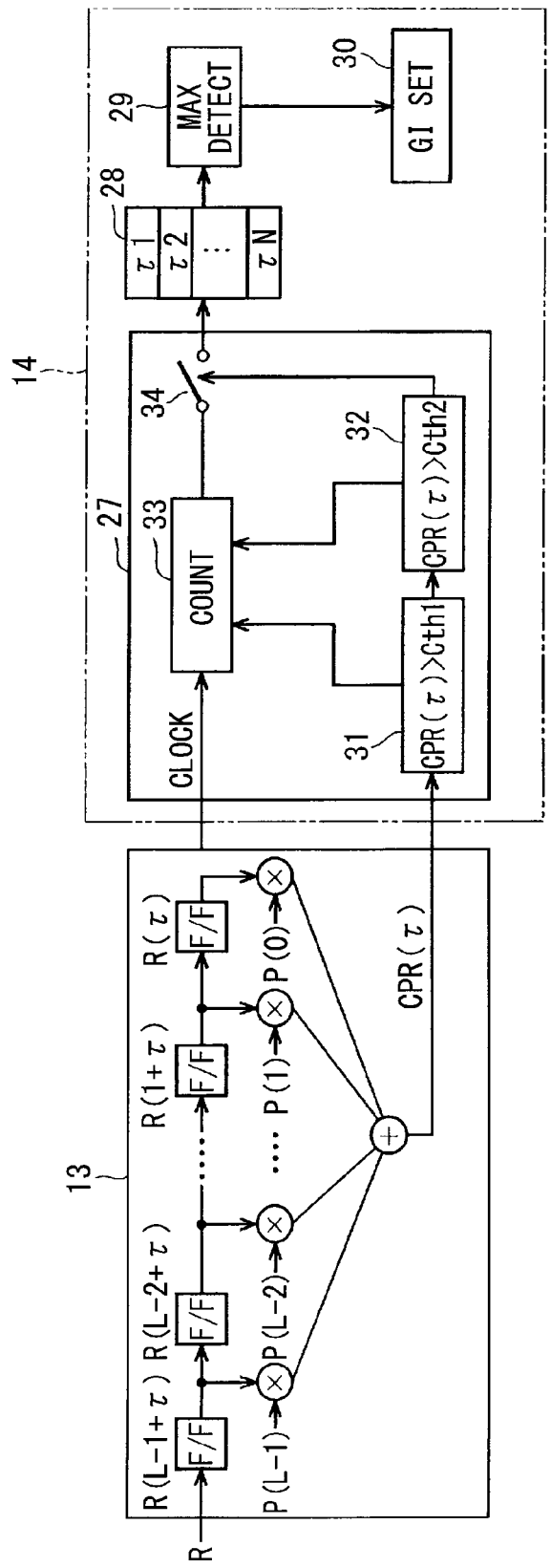
FIG. 4 is a diagram of a configuration of the correlator and a guard interval length determination portion according to the first embodiment.

The GI length determination portion 14 includes a correlation value determination portion 27, a delay time storage portion 28, a maximum value detection portion 29, and a GI length setting portion 30, as indicated in FIG. 1A and FIG. 4. The correlation value determination portion 27 includes determination units 31 and 32, a count portion 33, and an output switch 34, as indicated in FIG. 4. The determination unit 31 determines whether a cross correlation value $CPR(\tau)$ outputted from the correlator 13 exceeds a first threshold value Cth1. The determination unit 32 determines whether a cross correlation value $CPR(\tau)$ outputted from the correlator 13 exceeds a second threshold value Cth2.

The count portion 33 counts the number of clocks (i.e., a clock count or a counted number of clocks) used in the correlator 13 from a first determination time point to a second determination time point. The first determination time point is a time point when the determination unit 31 determines that the cross correlation value $CPR(\tau)$ exceeds the first threshold value Cth1, whereas the second determination time point is a time point when the determination unit 32 determines that the cross correlation value $CPR(\tau)$ exceeds the second threshold value Cth2. The output switch 34 is closed at the time when the counting ends. Thereby, the counted value (i.e., the counted number of clocks) is stored in the delay time storage portion 28 as a delay time $\tau n$.

On the condition that the delay times $\tau 1$ to $\tau N$ of all the slave apparatuses Sn are stored, the maximum value detection portion 29 obtains a maximum delay time $\tau max$ among the delay times $\tau 1$ to $\tau N$ and identifies the worst slave apparatus Sw that exhibits the maximum delay time $\tau max$. The GI length setting portion 30 determines a length of a guard interval as a determined guard interval length based on the maximum delay time $\tau max$. The GI length determination portion 14 transmits the determined guard interval length to the slave apparatuses S1 to SN while giving the determined guard interval length to the GI addition portion 18 and the GI elimination portion 24. Further, in the above, the determined guard interval length may be referred to as a common guard interval length, a common length of a guard interval, or a common length of a common guard interval. Further, the common guard interval may be referred to as a regular guard interval.

Figure 1B:
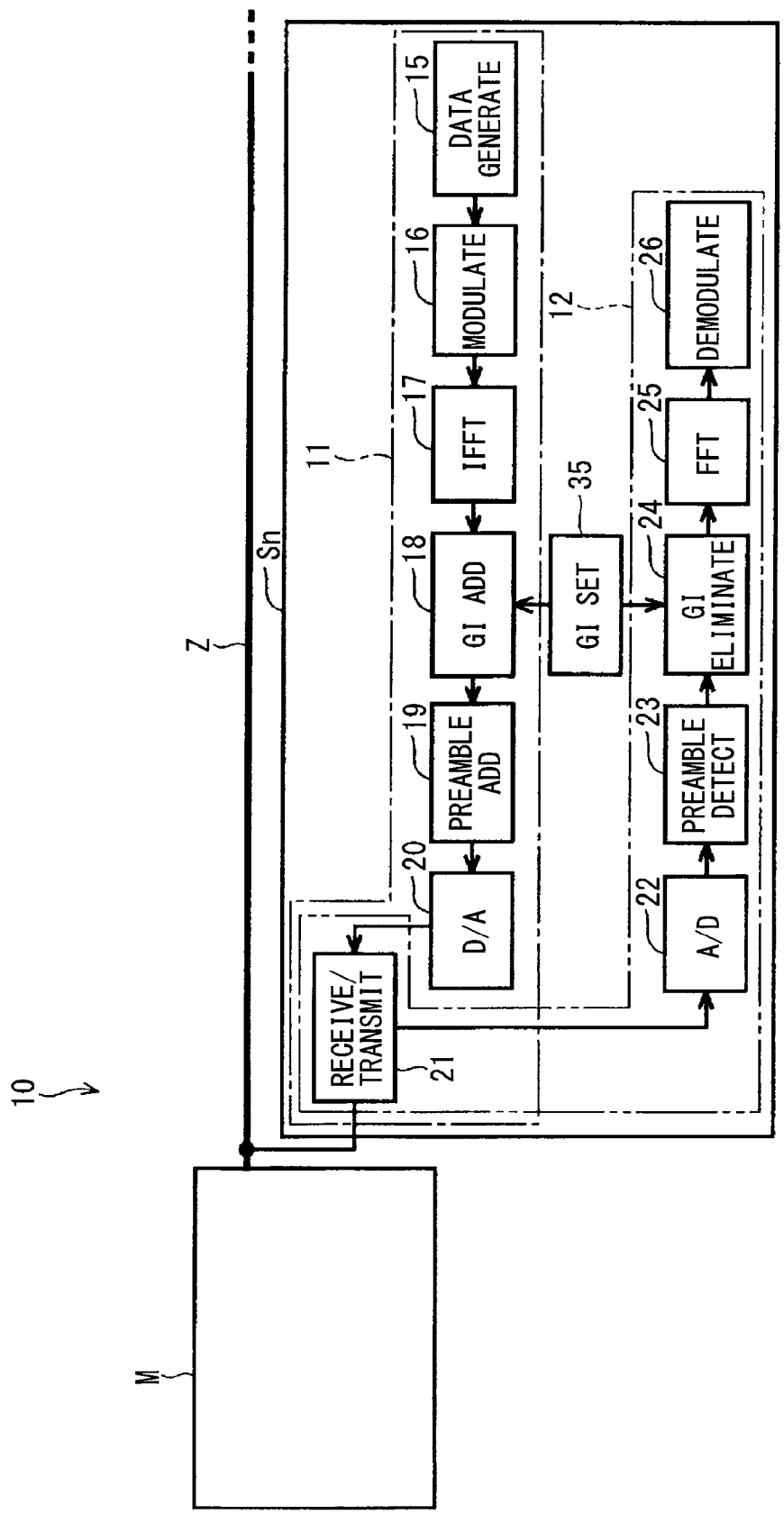
FIG. 1B is a block diagram of a slave apparatus according to the first embodiment.

Each slave apparatus Sn includes a transmission portion 11 and a reception portion 12 that are the same as those of the master apparatus M, as indicated in FIGS. 1A and 1B. The GI length setting portion 35 gives the determined guard interval length that is received from the master apparatus M to the GI addition portion 18 and the GI elimination portion 24. Therefore, the guard interval length used in the master apparatus M is the same as the guard interval length in each slave apparatus Sn of the slave apparatuses S1 to SN.

The following will explain an operation according to the present embodiment with reference to FIGS. 5 to 13. The communication system 10 including an in-vehicle LAN may undergo changes of nodes such as an optional addition of a node as a sensor or actuator, or a deletion of a node that is no longer useful. Such addition or deletion changes the topology of the transmission cable Z and a propagation/spread characteristic of channels in between the master apparatus M and each slave apparatus Sn.

Figure 5:
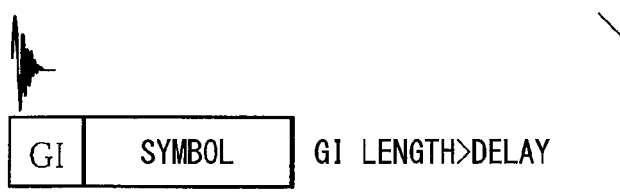
FIG. 5 is a diagram for explaining a function of a guard interval.
Figure 5:
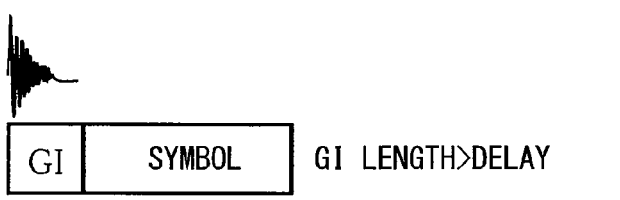
Figure 5:
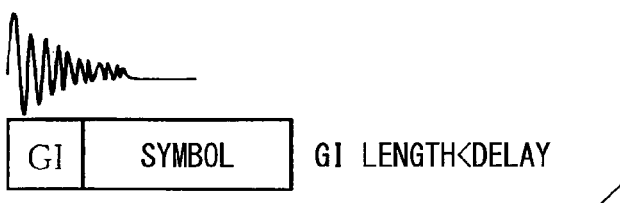

The OFDM communication uses a guard interval that is added to a starting point so as to prevent an inter symbol interference due to a delay propagating or spreading in the transmission cable Z; the guard interval may be a copy, or duplication, of a part of a valid symbol. FIG. 5 indicates the relation between (i) a delay wave of an immediately previous OFDM symbol and (ii) a direct wave of a present OFDM symbol following the immediately previous OFDM signal, with respect to the channels 1, 2, and N. The inter symbol interference is avoided in the channels 1 and 2 only exhibiting a delay (i.e., spread of delay) that is shorter than a guard interval length. In contrast, the inter symbol interference arises in the channel N exhibiting a delay longer than the guard interval length, thereby possibly involving a reception error. The spread of delay is caused significantly at a branch point or a terminating end. In the example indicated in FIG. 2, the slave apparatus SN does not always suffer a longest spread of delay (i.e., maximum delay or slowest delay).

In responding to the change of the delay due to the change of the propagation characteristic of the channels, the master apparatus M dynamically determines a guard interval length by using the correlator 13 and the GI length determination portion 14. When the power source is turned on, each of the master apparatus M and the slave apparatuses S1 to SN performs an initial setup (i.e., an initial configuration) of common communication parameters to the transmission portion 11 and the reception portion 12 before starting the communications. The communication parameters include an initial guard interval length (initial length), a length (constant in the present embodiment) of a symbol, and a mode (constant in the present embodiment) of a primary modulation.

Figure 6:
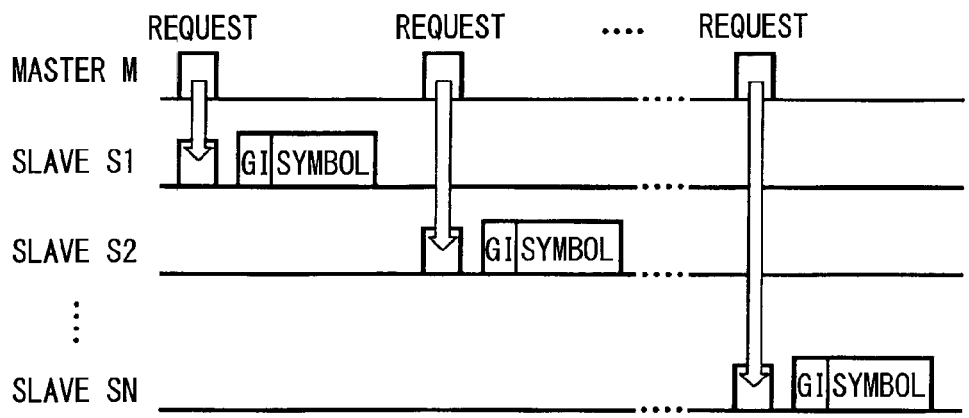
FIG. 6 is a sequence diagram of communications in a guard interval length determination process.
Figure 7:
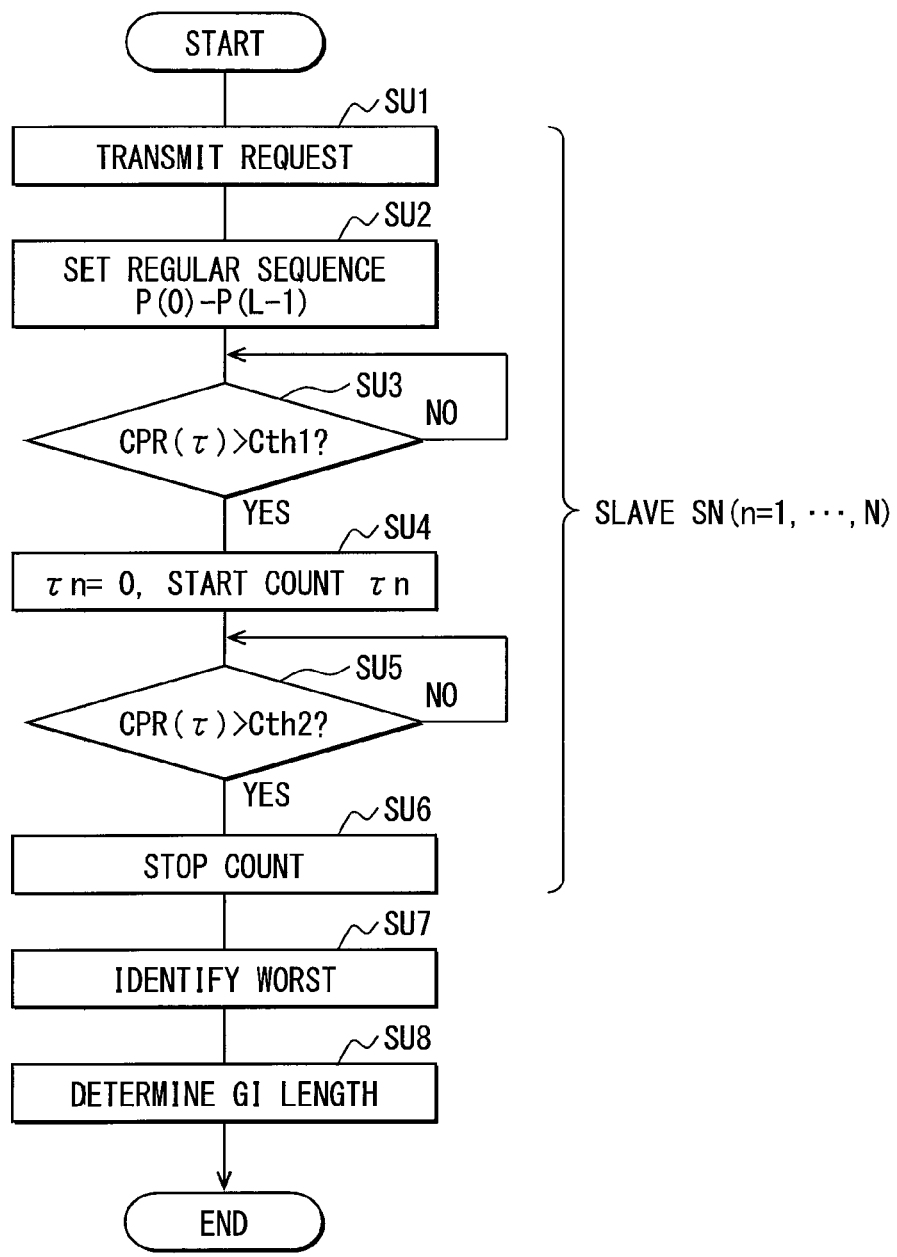
FIG. 7 is a flowchart diagram of a guard interval length determination process that the master apparatus executes.

With reference to FIG. 6 and FIG. 7, the master apparatus M selects the slave apparatuses S1 to SN one by one in order without overlap, and executes repeatedly a process of SU1 to SU6 with respect to the selected slave apparatus Sn. That is, the master apparatus M applies OFDM modulation to a transmission request data, which requests a transmission of a regular sequence P, and adds a guard interval to the OFDM modulated data, thereby transmitting it to the slave apparatus Sn (SU1). In addition, the master apparatus M sets the regular sequence P(0) to P(L−1) to the coefficient of the correlator 13

(SU2). The length of the guard interval added at this time is specified to be a length (i.e., specified length) that prevents an inter symbol interference. If being specified to prevent an inter symbol interference, the initial length can be used as it is without any change.

As mentioned above, the regular sequence P is a sequence acquired by adding a guard interval having an initial length to a valid symbol; the valid symbol is obtained by applying OFDM modulation to a regular data. In detail, the regular sequence P is inputted into the D/A converter 20 when a regular data is set to the transmission data generation portion 15. To be mentioned later, the master apparatus M obtains the magnitude of the delay using a reception sample sequence R received from the slave apparatus Sn. Thus the initial length of the guard interval just needs to have a length (i.e., specified length) greater than zero. It is noted that the regular sequence P prepared in the master apparatus based on the regular data may be referred to as the first regular sequence P.

Figure 8:
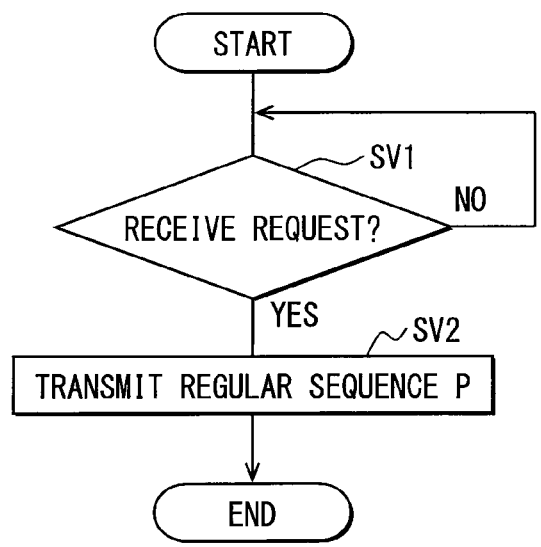
FIG. 8 is a flowchart diagram of a regular sequence transmission process that a slave apparatus executes.

With reference to FIG. 8, the slave apparatus Sn determines whether to receive a transmission request data (SV1). When receiving the transmission request data, the slave apparatus Sn sets a regular data to the transmission data generation portion 15. Thereby, the transmission portion 11 of the slave apparatus Sn transmits the OFDM signal of the regular sequence P (SV2). It is noted that the regular sequence P prepared in each slave apparatus Sn may be referred to as the second regular sequence P, whereas the OFDM signal of the regular sequence P transmitted from each slave Sn may be referred to as the OFDM signal of the second sequence P.

Figure 9:
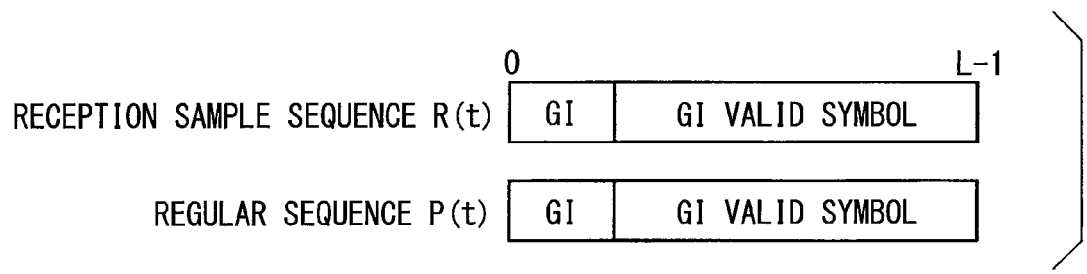
FIG. 9 is a diagram of configurations of a reception sample sequence and a regular sequence.
Figure 10:
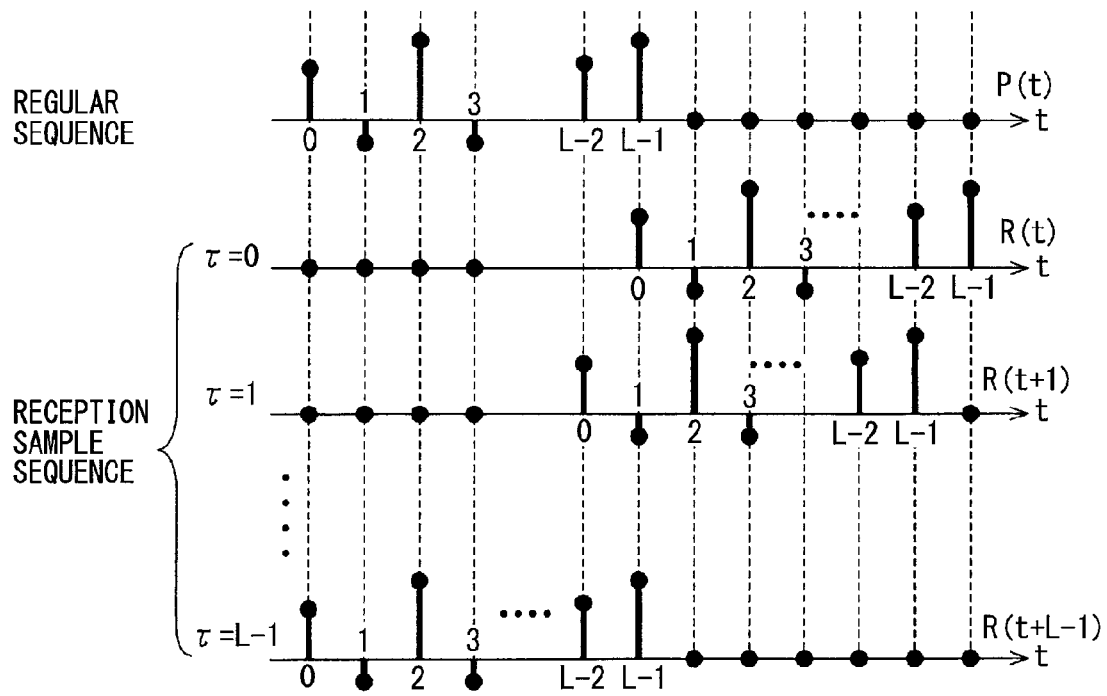
FIG. 10 is a diagram illustrating relation between a reception sample sequence and a regular sequence.

At SU3, the master apparatus M compares a cross correlation value CPR($\tau$) outputted from the correlator 13 with a first threshold value Cth1 and a second threshold value Cth2. As indicated in FIG. 9, each of the reception sample sequence R and the regular sequence P is consisted of L samples that have the guard interval and the valid symbol. FIG. 10 indicates a relation between a reception sample sequence R and a regular sequence P at the time $\tau$ that is counted based on a sampling period (i.e., sample time) of a reception signal; the time $\tau$ is an elapsed time since the time point 0 (zero) when a direct wave arrives.

Figure 11:
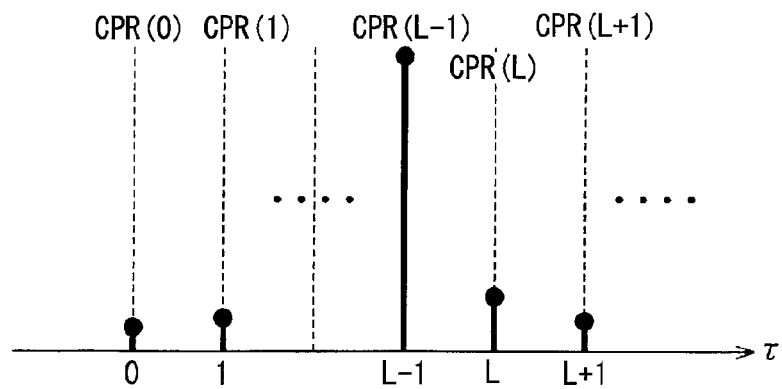
FIG. 11 is a diagram illustrating characteristics of a cross correlation value with respect to an OFDM signal.

Since the spectrum of the OFDM signal is close to the white noise, the correlation value becomes very small. As indicated in FIG. 11, the cross correlation value CPR($\tau$) between the regular sequence P and reception sample sequence R by the direct wave appears to be large (great), only at the time L−1 having passed since the time ($\tau$=0) of receiving the direct wave. At other time points, the cross correlation value CPR($\tau$) becomes very small. The cross correlation value CPR($\tau$) is indicated with a formula (1).

$$CPR(\tau) = \sum_{t=0}^{L-1} P(t)R(t+\tau) \quad (1)$$

Suppose that a regular sequence P(t) transmitted by the slave apparatus Sn is defined as a transmission sequence S(t). In this case, a reception sample sequence R(t) in the master apparatus M is expressed with a formula (2) where a delay wave is superimposed. Now, R(t+$\tau$) in the formula (1) turns into a formula (3).

$$R(t) = \sum_{m=0}^{L-1} a_{m,0}S(t+m) \quad (2)$$

$$R(t+\tau) = \sum_{m=0}^{L-1} a_{m,\tau}S(t+\tau+m) \quad (3)$$
$$= a_{0,\tau}S(t+\tau) + a_{1,\tau}S(t+\tau+1) + \ldots +$$
$$a_{L-1,\tau}S(t+\tau+L-1)$$

When the formula (3) is substituted to the formula (1), the cross correlation value CPR($\tau$) turns into a formula (4).

$$CPR(\tau) = \sum_{t=0}^{L-1} P(t) \sum_{m=0}^{L-1} a_{m,\tau}S(t+\tau+m) \quad (4)$$
$$= \sum_{t=0}^{L-1} \{a_{0,\tau}P(t)S(t+\tau) + a_{1,\tau}P(t)S(t+\tau+1) + \ldots \ldots +$$
$$a_{L-1,\tau}P(t)S(t+\tau+L-1)\}$$

The first term of the formula (4) is a cross correlation value due to a direct wave. The second term is a cross correlation value due to a delay wave that delays by 1 sample time. That is, when a delay wave with a great amplitude is overlapped, the cross correlation value CPR($\tau$) outputted from the correlator 13 appears to be great not only at the time L−1 corresponding to the direct wave but also at the time $\tau$ ($\tau$>L−1) corresponding to the delay wave.

Then, the determination unit 31 of the correlation value determination portion 27 determines whether the cross correlation value CPR($\tau$) exceeds the first threshold value Cth1 so as to detect a direct wave (SU3). The first threshold value Cth1 is set to be a value smaller than the cross correlation value CPR(L−1) deriving from the reception sample sequence R of the direct wave. When the determination unit 31 determines that the cross correlation value CPR($\tau$) exceeds the first threshold value Cth1, the count portion 33 resets a delay time $\tau$n corresponding to the slave apparatus Sn to zero, and starts to count a delay value $\tau$n with a clock used in the correlator 13 (SU4).

Then, after the cross correlation value CPR($\tau$) having exhibited a peak corresponding to the direct wave decreases at once, the determination unit 32 of the correlation value determination portion 27 determines whether the cross correlation value CPR($\tau$) exceeds the second threshold value Cth2 (SU5) so as to detect a delay wave. Furthermore, a delay degree of a delay wave and an amplitude of the delay wave vary depending on the topology of the transmission cable Z. Thus, the second threshold value Cth2 is set to be a value, which is smaller than the first threshold value Cth1 and simultaneously smaller than a specified peak value of the cross correlation value CPR($\tau$). This specified peak value is to derive from the reception sample sequence R of the delay wave having an amplitude that poses a communication error at an occurrence of an inter symbol interference. When being determined to exceed the second threshold value Cth2, the correlation value determination portion 27 stops counting of the clock and stores the delay time $\tau$n in the delay time storage portion 28 via the output switch 34 (SU6).

Figure 12A:
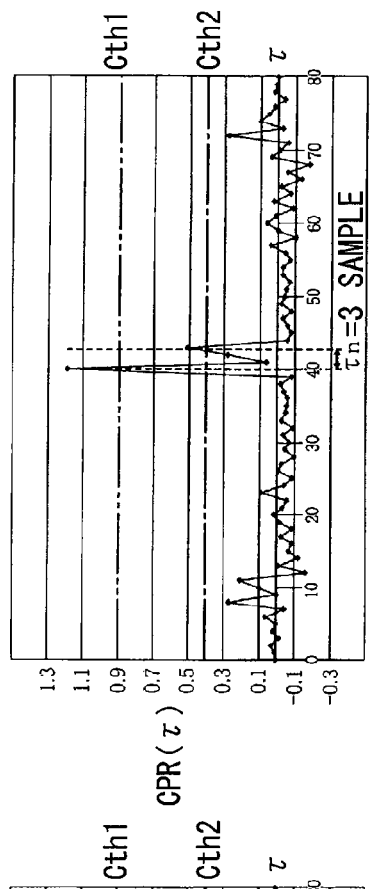
FIGS. 12A, 12B, 12C, and 12D are diagrams illustrating variations of cross correlation values relative four kinds of delay waves.

FIGS. 12A to 12D indicate the examples of the cross correlation value CPR($\tau$) outputted from the correlator 13 when the length of a valid symbol has 32 samples and the initial length of the guard interval has 8 samples. The first threshold value Cth1 (two-dot chain line) is 0.9; the second threshold value Cth2 (one-dot chain line) is 0.4. FIG. 12A illustrates a reception sample sequence R including only a direct wave.

Figure 12B:
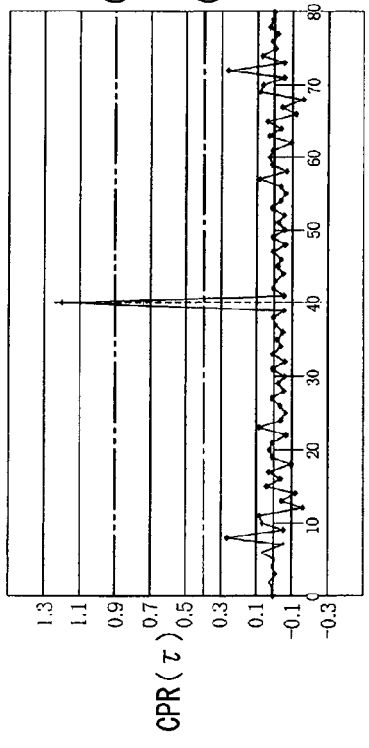
Figure 12C:
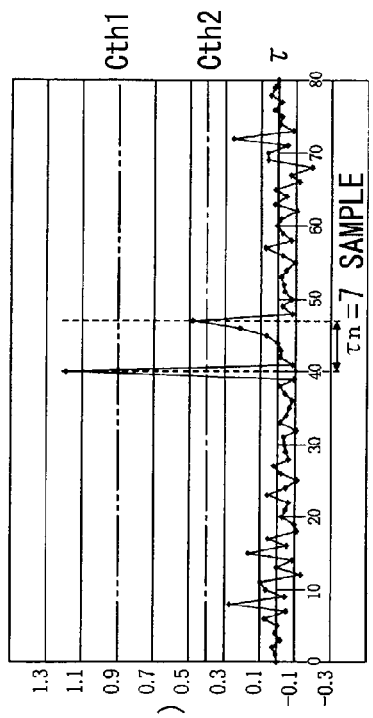
Figure 12D:
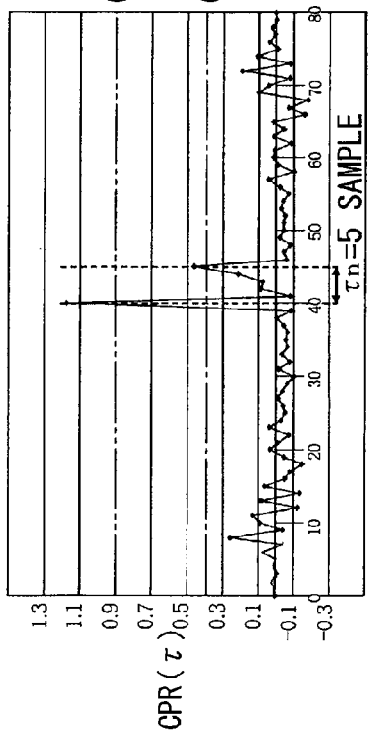

FIG. 12B illustrates a reception sample sequence R including (or being overlapped with) a direct wave and three delay waves delaying by τ=1, 2, and 3. Any other delay waves other than three delay waves do not exist. FIG. 12C illustrates a reception sample sequence R including (or being overlapped with) a direct wave and five delay waves delaying by τ=1, 2, 3, 4, and 5. FIG. 12D illustrates a reception sample sequence R including (or being overlapped with) a direct wave and seven delay waves delaying by τ=1, 2, 3, 4, 5, 6, and 7.

Define the amplitude of a delay wave delaying by m sample time as "am" that is equivalent to "am,0" in the formula (2). In this case, the amplitude am in FIGS. 12A to 12D are set to the followings. It is noted that the followings are set to cause the slowest delay wave to have the greatest amplitude among the delay waves. However, the amplitude of an actual delay wave may not need thereto.

(a) a0=1.0
(b) a0=1.0, a1=0.125, a2=0.25, a3=0.5
(c) a0=1.0, a1=0.025, a2=0.075, a3=0.125, a4=0.25, a5=0.5
(d) a0=1.0, a1=0.0075, a2=0.0127, a3=0.025, a4=0.075, a5=0.125, a6=0.25, a7=0.5

In the case (a), any delay wave does not exist; thus, the cross correlation value CPR(τ) does not exceed the second threshold value Cth2. When the cross correlation value CPR(τ) does not exceed the second threshold value Cth2 within a predetermined determination time, the correlation value determination portion 27 stores the delay time τn=0 (zero) in the delay time storage portion 28. In the case (b), the delay time τn=3. In the case (c), the delay time τn=5. In the case (d), the delay time τn=7.

When the GI length determination portion 14 stores the delay times τn of all the slave apparatuses S1 to SN in the delay time storage portion 28, the maximum value detection portion 29 identifies the greatest or maximum delay time τmax among the delay times τ1 to τN and the corresponding slave apparatus exhibiting the maximum delay time τmax (worst slave apparatus Sw) (SU7). The GI length setting portion 30 determines a guard interval length corresponding to the maximum delay time τmax with reference to a table indicated in FIG. 13 (SU8). The GI length setting value indicated in the table may be provided to have a margin.

The GI length determination portion 14 transmits the determined guard interval length as a common guard interval length (i.e., a common length of the guard interval) to the slave apparatuses S1 to SN. The slave apparatuses S1 to SN holds the received common guard interval length in the GI length setting portion 35. Then, the master apparatus M and the slave apparatus Sn perform OFDM communications using a guard interval having the common guard interval length. It is noted that a determination process of a guard interval length in FIG. 7 uses the reception sample sequence R outputted from the A/D converter 22; thus, the reception portion 12 does not need to use the preamble detection portion 23 and any following processing portions.

As explained above, according to the present first embodiment, the master apparatus M includes the correlator 13 and the GI length determination portion 14, in addition to the transmission portion 11 and the reception portion 12 according to the OFDM modulation. The master apparatus M obtains a delay time τn taking place in the communication with each slave apparatus Sn based on the cross correlation value CPR(τ) between (i) the reception sample sequence R of the (second) regular sequence transmitted from each slave apparatus Sn and (ii) the (first) regular sequence P that the master apparatus M itself has or prepares. The guard interval length is then determined as a common guard interval length based on the maximum value or maximum delay time τmax among the delay times τ1 to τN.

There may be a case where the topology of the transmission cable Z is changed due to the addition/deletion of a slave apparatus or a branch point. Even in such a case, the guard interval length can be dynamically specified so as to help prevent the decline in the transmission efficiency or the increase in the electricity consumption due to the redundancy. In addition, the master apparatus M needs only one transmission/reception for each slave apparatus Sn; thus, the length of the guard interval can be determined with a short time as compared with a conventional technology that needs a plurality of transmissions/receptions.

Since the spectrum of the OFDM signal is close to the white noise, the cross correlation value CPR(τ) appears to be great only when the reception sample sequence R and the regular sequence P coincide with each other. Therefore, the comparison of the cross correlation value CPR(τ) with the first threshold value Cth1 and the second threshold value Cth2 permits the detection of the direct wave and the delay waves to thereby detect a delay time τn with sufficient accuracy. In this case, the second threshold value Cth2 is specified to be smaller than the first threshold value Cth1; this permits accurate detection of not only the direct wave but also the delay waves attenuated due to the reflection.

Second Embodiment

Figure 14:
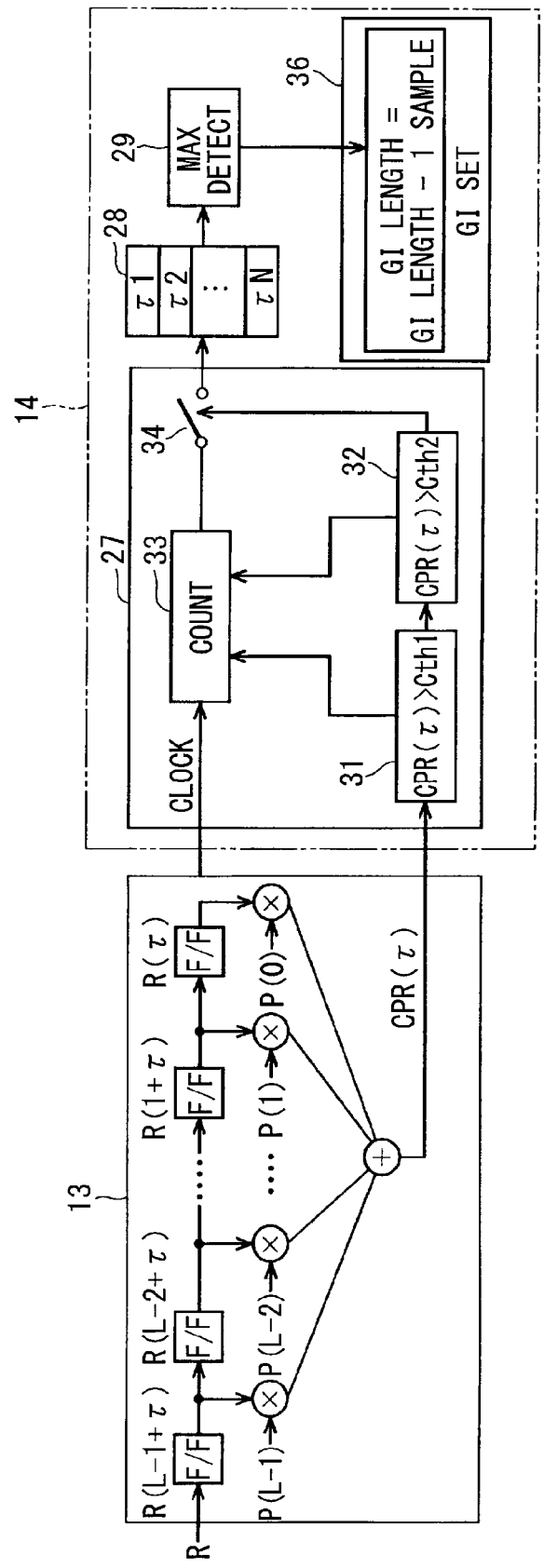
FIG. 14 is a diagram of a configuration of a correlator and a guard interval length determination portion according to a second embodiment of the present disclosure.

The following will explain a second embodiment of the present disclosure with reference to FIGS. 14 to 18. With reference to FIG. 14, the master apparatus M of the present second embodiment includes a GI length setting portion 36 that replaces the GI length setting portion 30 in the first embodiment. The other configuration is the same as that of the first embodiment.

The GI length determination portion 14 executes two steps; the first step is identical to the process indicated in FIG. 7 in the first embodiment. That is, the maximum value detection portion 29 identifies the worst slave apparatus Sw that provides or exhibits the delay time τn to be maximum among those of all the slave apparatuses S1 to SN and obtains the maximum delay time τmax of the worst slave apparatus Sw (SU7). However, the GI length setting portion 36 in the present second embodiment determines a guard interval length corresponding to the maximum delay time τmax (SU8) with reference to a table indicated in FIG. 15, instead of that in FIG. 13. It is noted that the determined guard interval length may be referred to as a tentative common guard interval length or a tentative common length of the guard interval. The GI length determination portion 14 transmits the determined guard interval length to the slave apparatuses S1 to SN.

The margin is included in the values in the table in FIG. 15; for instance, a guard interval length is twice as many as the maximum delay time τmax. The margin is specified to be a sufficient length to prevent an inter symbol interference even when multiple delay waves take place. Therefore, it may be sometimes suitable that the guard interval length is specified to be three times, four times, . . . as many as the maximum delay time τmax.

Figure 16:
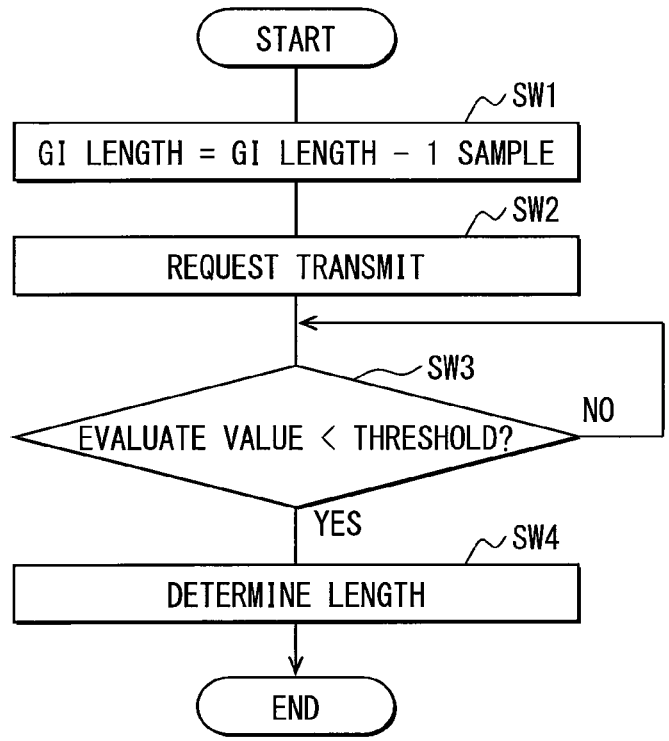
FIG. 16 is a flowchart diagram of a guard interval adjustment process that the master apparatus executes.
Figure 18:
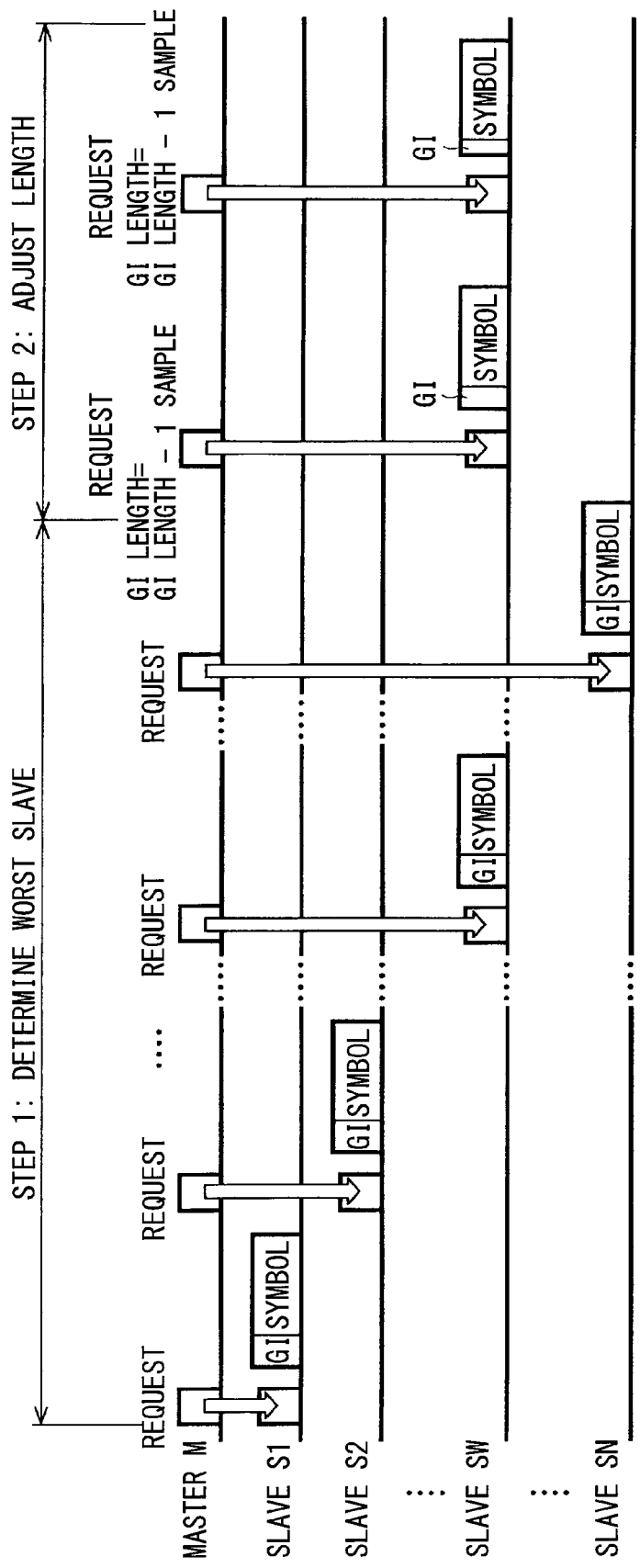
FIG. 18 is a sequence diagram of communications in a guard interval length determination process and a guard interval length adjustment process.

Then, the GI length setting portion 36 executes the second step that performs an adjustment process of the guard interval length indicated in FIG. 16. The GI length setting portion 36 shortens the guard interval length by only 1 sample time (SW1). The GI length setting portion 36 requests the worst slave apparatus Sw so as to cause the worst slave apparatus Sw to transmit an OFDM signal that is obtained by adding a guard interval having the shortened length to the valid symbol that is obtained by applying OFDM modulation to a regular data (SW2). The communicative sequence is indicated in FIG. 18.

Figure 17:
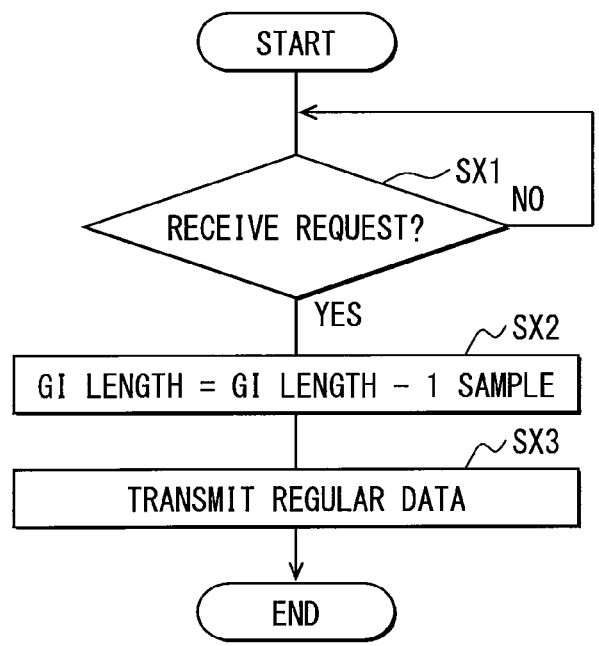
FIG. 17 is a flowchart diagram of a regular data transmission process that a slave apparatus executes.

With reference to FIG. 17, the worst slave apparatus Sw determines whether to receive a transmission request of a regular data (SX1). When receiving the transmission request, the worst slave apparatus Sw shortens the guard interval length by one sample time (SX2) and sets the regular data to the transmission data generation portion 15. Thereby, the transmission portion 11 of the worst slave apparatus Sw transmits the OFDM signal of the regular data (SX3).

At SW3 after SW2, the GI length setting portion 36 of the master apparatus M calculates an evaluation value related to a reception quality of data obtained by subjecting the received signal from the worst slave apparatus Sw to the OFDM demodulation. The evaluation value related to the reception quality is at least one of three evaluation values; three evaluation values are a bit error rate, a symbol error rate, and an error vector magnitude (EVM).

The bit error rate is defined as a ratio of a mismatching bit number to a total bit number (=(mismatching bit number)/(total bit number)) that is obtained by comparing the regular data with the data value after the primary demodulation in the reception portion 12. The symbol error rate is defined as a ratio of a mismatching symbol number to a total symbol number (=(mismatching symbol number)/(total symbol number)) that is obtained by comparing the symbols of the regular data with the symbols after the primary demodulation in the reception portion 12. The EVM (Error Vector Magnitude) is defined as a mean squared error between the data (complex vector) before the primary demodulation with the data (complex vector) after the primary demodulation of the regular data.

The GI length setting portion 36 determines whether the evaluation value related to the reception quality is lower than a predetermined evaluation threshold value (SW3). When being lower, the GI length setting portion 36 adopts finally as a post-adjustment value the guard interval length before being shortened by one sample time (SW4). The post-adjustment value may be also referred to as a final common length of the guard interval. In contrast, when being not lower, the GI length setting portion 36 repeatedly performs the processing from SW1 to SW3 until the evaluation value becomes lower than the evaluation threshold value. Suppose that at least two among three evaluation values of the bit error rate, the symbol error rate, and the error vector amplitude are selected. In this case, when at least one selected evaluation value becomes lower than a evaluation threshold value, the processing proceeds to SW4.

According to the present second embodiment, the first step and the second step are performed. That is, at the first step, a guard interval length with a margin is obtained based on the cross correlation value $CPR(\tau)$ between the regular sequence P and the reception sample sequence R. Then, at the second step, the guard interval length is adjusted by comparing the evaluation value related to the reception quality of the data received from the worst slave apparatus Sw having exhibited the maximum delay time $\tau max$ with an evaluation threshold value. This permits the determination of the guard interval length with a higher accuracy. The second step only needs to be conducted with respect to the worst slave apparatus Sw; this can adjust the guard interval to a necessary minimum length with a short time as compared with a conventional technology.

Third Embodiment

Figure 19A:
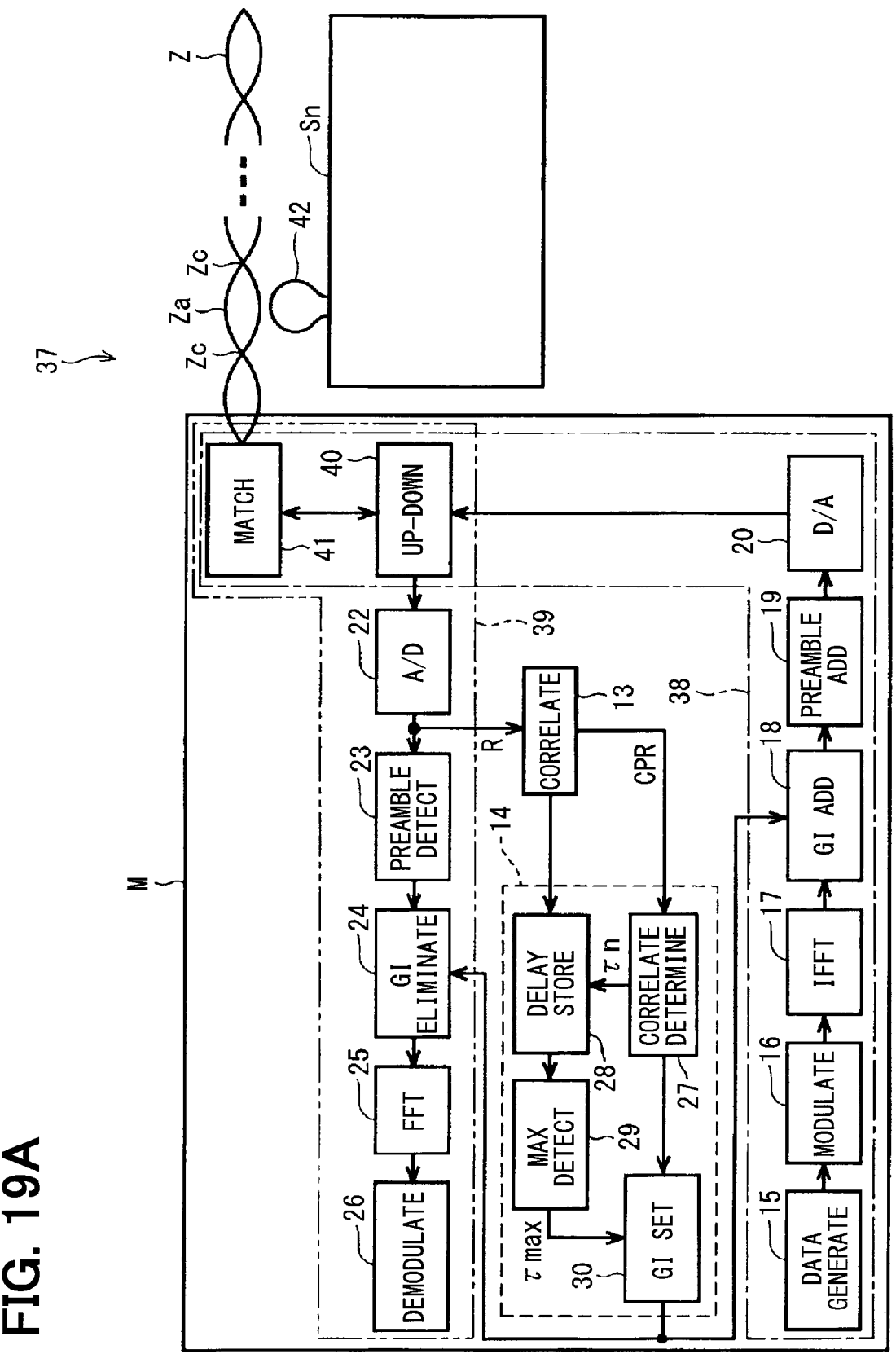
FIG. 19A is a block diagram of a master apparatus according to a third embodiment of the present disclosure.
Figure 19B:
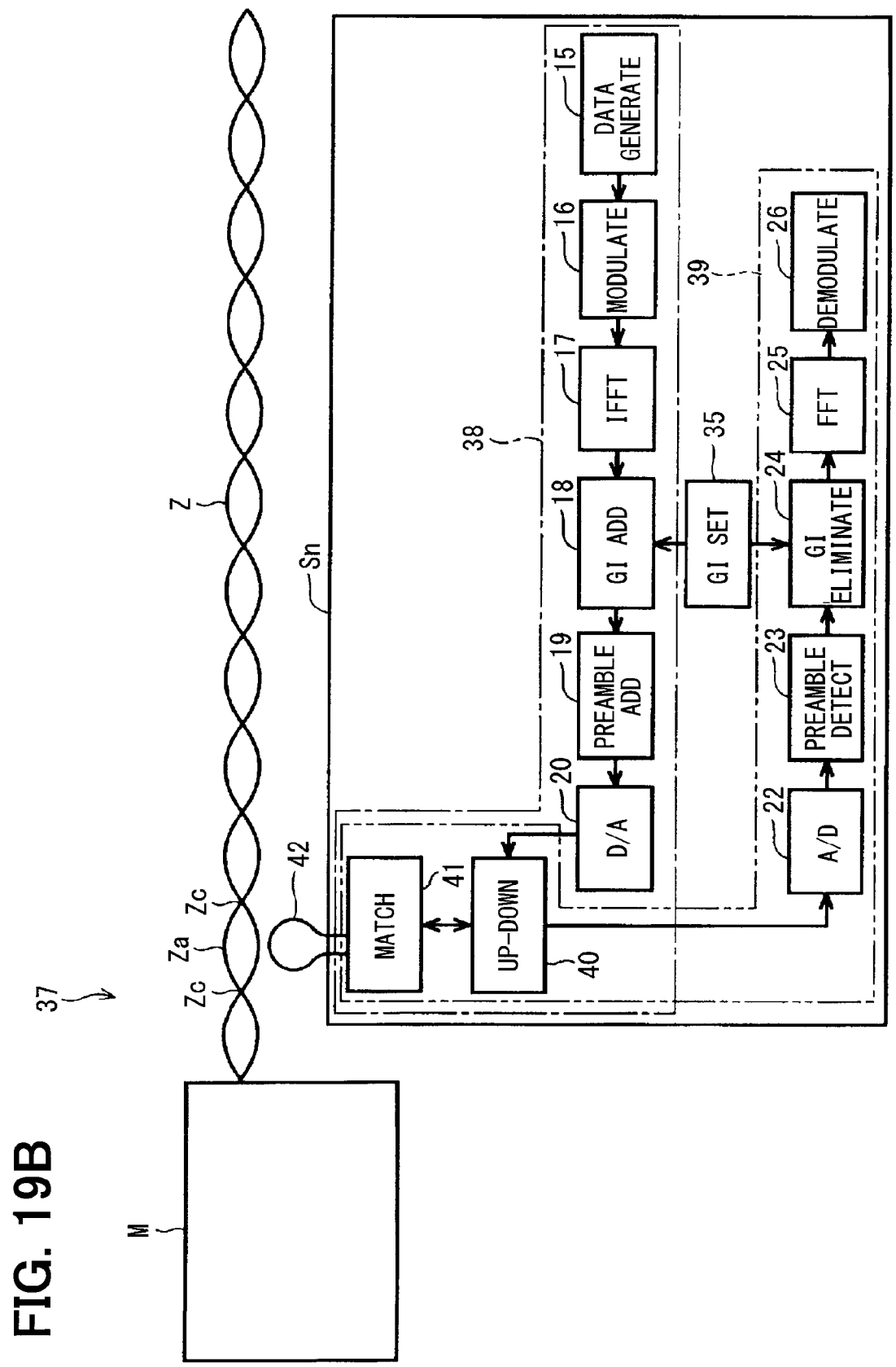
FIG. 19B is a block diagram of a slave apparatus according to the third embodiment.

The following will explain a third embodiment of the present disclosure with reference to FIG. 19. A communication system 37 is provided by applying the embodiment of the first or second embodiment to a contactless power line communication. In the communication system 37, a branch point between the transmission cable Z and each slave apparatus Sn includes a contactless coupler, performing the OFDM communication and the power transfer from the master apparatus M to the slave apparatus Sn. Therefore, in each of the master apparatus M and the slave apparatus Sn, the transmission portion 38 and the reception portion 39 each include an up-down converter 40 and a matching circuit 41, which replace the RF transmission/reception portion 21 in the first embodiment.

The transmission cable Z includes a twisted wire in which the core wires are connected at a terminal end to be shaped of a loop, transmitting OFDM signals and electric power. A pair of wires included in the twisted wire is twisted to intersect with predetermined intervals to form an opening area or aperture Za between the adjacent intersecting portions Zc. The matching circuit 41 of the master apparatus M is connected to the end portion of the transmission cable Z; the matching circuit 41 of the slave apparatus Sn is connected to the aperture antenna 42 shaped of a circular loop. The matching circuit 41 changes a capacity value of a capacity-variable capacitor to perform impedance matching, for example.

The opening area of the aperture antenna 42 is provided to oppose the opening area Za of the transmission cable Z. Thereby, the aperture antenna 42 of the slave apparatus Sn carries out electromagnetic induction connection to the transmission cable Z densely. The slave apparatus Sn performs transmission and reception of the OFDM signal and reception of the electric power in contactless communications via the aperture antenna 42. The up-down converter 40 converts the transmission and reception signals on base band into the transmission and reception signals on carrier band being high frequencies.

The master apparatus M includes a high-frequency power generation circuit that generates an electric power AC signal, and a superimposition/separation circuit that superimposes an OFDM signal on the electric power AC signal to acquire a transmission signal. The slave apparatus Sn includes a superimposition/separation circuit that divides a reception signal into an OFDM signal and an electric power AC signal, and a rectification circuit that rectifies the electric power AC signal to acquire direct current power. The slave apparatus Sn operates on electric power transmitted from the master apparatus M.

According to the present third embodiment, the branch point between the transmission cable Z and each slave apparatus Sn is contactless; thus, the addition/deletion of the slave apparatus Sn or the branch point becomes easy. The addition/deletion causes a change in the propagation characteristic of the channel between the master apparatus M and each slave apparatus Sn. In such a change, a guard interval may be dynamically adjusted with a technology or configuration explained in the first or second embodiment.

Other Embodiments

As long as a direct wave and a delay wave posing a communication error due to an inter symbol interference are detected, the second threshold value Cth2 may be specified to be identical to or greater than the first threshold value Cth1.

In the second step of the second embodiment, the guard interval length may be shortened by more than one sample time at SW1 and SX2.

While the aspect of the disclosure described herein are already recited in the preceding summary, further optional aspects thereto may be set forth as follows.

For instance, as an optional aspect of the disclosure, in the communication system, the guard interval length determination portion may define, as a tentative common length, the common length after determining the common length of the guard interval, perform shortening the tentative common length by a predetermined sample time to obtain a shortened length, and perform outputting a different request to a worst slave apparatus that is the slave apparatus providing the maximum delay time to cause the worst slave apparatus to (i) prepare a different OFDM signal and (ii) transmit the different OFDM signal, the worst slave apparatus preparing the different OFDM signal by applying OFDM modulation to the regular data to obtain the regular valid symbol and adding the guard interval having the shortened length to the obtained regular valid symbol. Upon receiving the different OFDM signal from the worst slave apparatus, the guard interval length determination portion may perform a quality determination as to whether an evaluation value related to a reception quality of data obtained by applying OFDM demodulation to the received different OFDM signal is smaller than a predetermined evaluation threshold value. When the evaluation value is smaller than the predetermined evaluation threshold value, the guard interval length determination portion adopts, as a final common length of the guard interval, the tentative common length before being shortened to obtain the shortened length. When the evaluation value is not smaller than the predetermined evaluation threshold value, the guard interval length determination portion defines the shortened length newly as the tentative common length and performs repeatedly a series of (i) the shortening of the tentative common length, (ii) the outputting of the different request, and (iii) the quality determination, with respect to the worst slave apparatus, until the evaluation value becomes smaller than the predetermined evaluation threshold value.

According to the above configuration, a first step is roughly determining the common length of the guard interval based on the cross correlation value between the regular sequence and the reception sample sequence. Then, a second step is receiving a different OFDM signal from the worst slave apparatus that provides the maximum delay time and adjusting the common length of the guard interval by comparing the reception-quality evaluation value of the data having undergone OFDM demodulation with a predetermined evaluation threshold value. The second step only needs to be conducted with respect to the worst slave apparatus; this can adjust the common length of the guard interval to a necessary minimum length in a short time as compared with a conventional technology.

Further, in the above communication system, the evaluation value related to the reception quality of data obtained by applying OFDM demodulation may include at least one of three values of first to third values, the first value being a bit error rate, the second value being a symbol error rate, the third value being an error vector magnitude.

Further, as an optional aspect of the communication system, the transmission line may include a twisted wire of which terminal ends are connected to form a loop shape, the twisted wire transmitting an OFDM signal and electric power. The master apparatus may perform an input and output of a high frequency signal with the twisted wire to perform transmission and reception of the OFDM signal and transmission of the electric power. Each of the slave apparatuses may include a loop-shaped aperture antenna having an opening area that opposes an opening area between adjoining intersecting portions of the twisted wire to perform electromagnetic induction connection with the twisted wire, performing transmission and reception of the OFDM signal and reception of the electric power with a high frequency via the aperture antenna.

This configuration provides a branch point between the transmission line and each slave apparatus to be contactless. This makes it easier to perform addition/deletion of a slave apparatus or the branch point. Under the configuration of a multipass channel, high-frequency signals are used; this favors the OFDM modulation mode.

Further, as an optional aspect of the communication system, the second threshold value may be set to be smaller than the first threshold value.

Under such configuration, the comparison between the cross correlation value and the first threshold value permits the detection of the direct wave arriving. In contrast, the comparison between the cross correlation value and the second threshold value permits the detection of the delay wave arriving. According to the configuration, the arrival of the direct wave and the arrival of the delay wave attenuated due to the reflection can be detected certainly.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A communication system including
a master apparatus that is connected to a transmission line and performs communications with OFDM signals, and
a plurality of slave apparatuses that are connected to the transmission line and perform communications with OFDM signals,
the master apparatus comprising:
a transmission portion that transmits via the transmission line OFDM signals obtained by adding guard intervals to valid symbols, the valid symbols being obtained with OFDM modulation;
a reception portion that receives OFDM signals via the transmission line, samples the received OFDM signals to obtain reception sample sequences, removes guard intervals from the received OFDM signals in the reception sample sequences to obtain valid symbols, and applies OFDM demodulation to the valid symbols;
a guard interval length determination portion that outputs a request to the slave apparatuses to cause the slave apparatuses each to (i) prepare an OFDM signal of a second regular sequence and (ii) transmit the OFDM signal of the second regular sequence in order without overlap between the slave apparatuses, the slave apparatuses each preparing the OFDM signal of the second regular sequence by applying OFDM modulation to a regular data to obtain a regular valid symbol and adding a guard interval having a specified length greater than zero to the obtained regular valid symbol; and
a correlation calculation portion that calculates a cross correlation value between (i) a first regular sequence and (ii) the reception sample sequence obtained by sampling the OFDM signal of the second regular sequence transmitted from each of the slave apparatuses, the correlation calculation portion preparing the first regular sequence by applying OFDM modulation to the regular data to obtain the regular valid symbol and adding the guard interval having the specified length to the regular valid symbol, the guard interval length determination portion further storing, as a delay time of each of the slave apparatuses, a time interval from when the cross correlation value outputted by the correlation calculation portion exceeds a first threshold value after outputting the request to each of the slave apparatuses to when the cross correlation value exceeds a second threshold value, obtaining a maximum delay time among the delay times of the slave apparatuses, determining a common length of the guard interval that is used in common for communications between the master apparatus and each of the slave apparatuses based on the maximum delay time, and transmitting the common length of the guard interval to the slave apparatuses.

2. The communication system according to claim 1, wherein:

the guard interval length determination portion defines, as a tentative common length, the common length after determining the common length of the guard interval, performs shortening the tentative common length by a predetermined sample time to obtain a shortened length, performs outputting a different request to a worst slave apparatus that is the slave apparatus providing the maximum delay time to cause the worst slave apparatus to (i) prepare a different OFDM signal and (ii) transmit the different OFDM signal, the worst slave apparatus preparing the different OFDM signal by applying OFDM modulation to the regular data to obtain the regular valid symbol and adding the guard interval having the shortened length to the obtained regular valid symbol, and performs, upon receiving the different OFDM signal from the worst slave apparatus, a quality determination as to whether an evaluation value related to a reception quality of data obtained by applying OFDM demodulation to the received different OFDM signal is smaller than a predetermined evaluation threshold value;

when the evaluation value is smaller than the predetermined evaluation threshold value, the guard interval length determination portion adopts, as a final common length of the guard interval, the tentative common length before being shortened to obtain the shortened length; and when the evaluation value is not smaller than the predetermined evaluation threshold value, the guard interval length determination portion defines the shortened length newly as the tentative common length and performs repeatedly a series of (i) the shortening of the tentative common length, (ii) the outputting of the different request, and (iii) the quality determination, with respect to the worst slave apparatus, until the evaluation value becomes smaller than the predetermined evaluation threshold value.

3. The communication system according to claim 2, wherein the evaluation value related to the reception quality of data obtained by applying OFDM demodulation includes at least one of three values of first to third values, the first value being a bit error rate, the second value being a symbol error rate, the third value being an error vector magnitude.

4. The communication system according to claim 1, wherein:

the transmission line includes a twisted wire of which terminal ends are connected to form a loop shape, the twisted wire transmitting an OFDM signal and electric power;

the master apparatus performs an input and output of a high frequency signal with the twisted wire to perform transmission and reception of the OFDM signal and transmission of the electric power; and each of the slave apparatuses includes a loop-shaped aperture antenna having an opening area that opposes an opening area between adjoining intersecting portions of the twisted wire to perform electromagnetic induction connection with the twisted wire, performing transmission and reception of the OFDM signal and reception of the electric power with a high frequency via the aperture antenna.

5. The communication system according to claim 1, wherein the second threshold value is set to be smaller than the first threshold value.

* * * * *